United States Patent
Wang et al.

(10) Patent No.: US 12,444,042 B2
(45) Date of Patent: Oct. 14, 2025

(54) METHOD OF DETECTING MISPRINTS, COMPUTING DEVICE, AND STORAGE MEDIUM

(71) Applicant: HON HAI PRECISION INDUSTRY CO., LTD., New Taipei (TW)

(72) Inventors: Cheng-Feng Wang, Kaohsiung (TW); Li-Che Lin, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 599 days.

(21) Appl. No.: 17/748,280

(22) Filed: May 19, 2022

(65) Prior Publication Data

US 2023/0092072 A1  Mar. 23, 2023

(30) Foreign Application Priority Data

Sep. 17, 2021  (CN) .......................... 202111092189.8

(51) Int. Cl.
*G06T 7/00* (2017.01)
*G06T 7/12* (2017.01)
(Continued)

(52) U.S. Cl.
CPC ................ *G06T 7/001* (2013.01); *G06T 7/12* (2017.01); *G06T 7/136* (2017.01); *G06T 7/70* (2017.01);
(Continued)

(58) Field of Classification Search
CPC .......... G06T 7/001; G06T 7/12; G06T 7/136; G06T 7/70; G06T 2207/20021;
(Continued)

(56) References Cited

U.S. PATENT DOCUMENTS

| | | | |
|---|---|---|---|
| 2008/0317347 A1* | 12/2008 | Lim | ...................... G06T 7/0002 |
| | | | 382/182 |
| 2018/0239981 A1* | 8/2018 | Johnson | ............. G06V 30/1429 |
| 2020/0028826 A1* | 1/2020 | Li | .......................... G06T 7/136 |

FOREIGN PATENT DOCUMENTS

CN          112763513          5/2021

OTHER PUBLICATIONS

Jayadevan, R., et al. "Offline recognition of Devanagari script: a survey." IEEE Transactions on Systems, Man, and Cybernetics, Part C (Applications and Reviews) 41.6 (2011): 782-796.
(Continued)

*Primary Examiner* — Akwasi M Sarpong
*Assistant Examiner* — Michael L Burleson
(74) *Attorney, Agent, or Firm* — ScienBiziP, P.C.

(57) ABSTRACT

A method of detecting misprints obtains a reference image of perfectly-formed characters and a test image showing the same characters. First image processing is performed on the reference image to obtain a first image, and first image processing is performed on the test image to obtain a second image. A second image processing is performed on the first image to obtain a first outline image of each of first characters in the reference image, and the second image processing is performed on the second image to obtain a second outline image of each of second characters in the test image. A corresponding first outline image is determined for the second outline image. A similarity between the corresponding first outline image and the second outline image is calculated. Accordingly, a detection result of the second outline image is determined. The method can detect character flaw accurately.

17 Claims, 2 Drawing Sheets

(51) Int. Cl.
  *G06T 7/136* (2017.01)
  *G06T 7/70* (2017.01)
(52) U.S. Cl.
  CPC ............... *G06T 2207/20021* (2013.01); *G06T 2207/30144* (2013.01)
(58) Field of Classification Search
  CPC . G06T 2207/30144; G06T 2207/20056; G06T 7/11; G06T 7/66
  See application file for complete search history.

(56) References Cited

OTHER PUBLICATIONS

Yao, Cong, et al. "Rotation-invariant features for multi-oriented text detection in natural images." PloS one 8.8 (2013): e70173.

* cited by examiner

METHOD OF DETECTING MISPRINTS, COMPUTING DEVICE, AND STORAGE MEDIUM

FIELD

The subject matter herein generally relates to quality control, specifically a method of detecting misprints, a computing device, and a storage medium.

BACKGROUND

Defects in letters and numbers and symbols which provide information (such as characters and symbols being misprinted) not only affects the appearance of products and their packaging, but may also mislead users. Therefore, it is necessary to detect such defects in or on products to improve product quality control.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
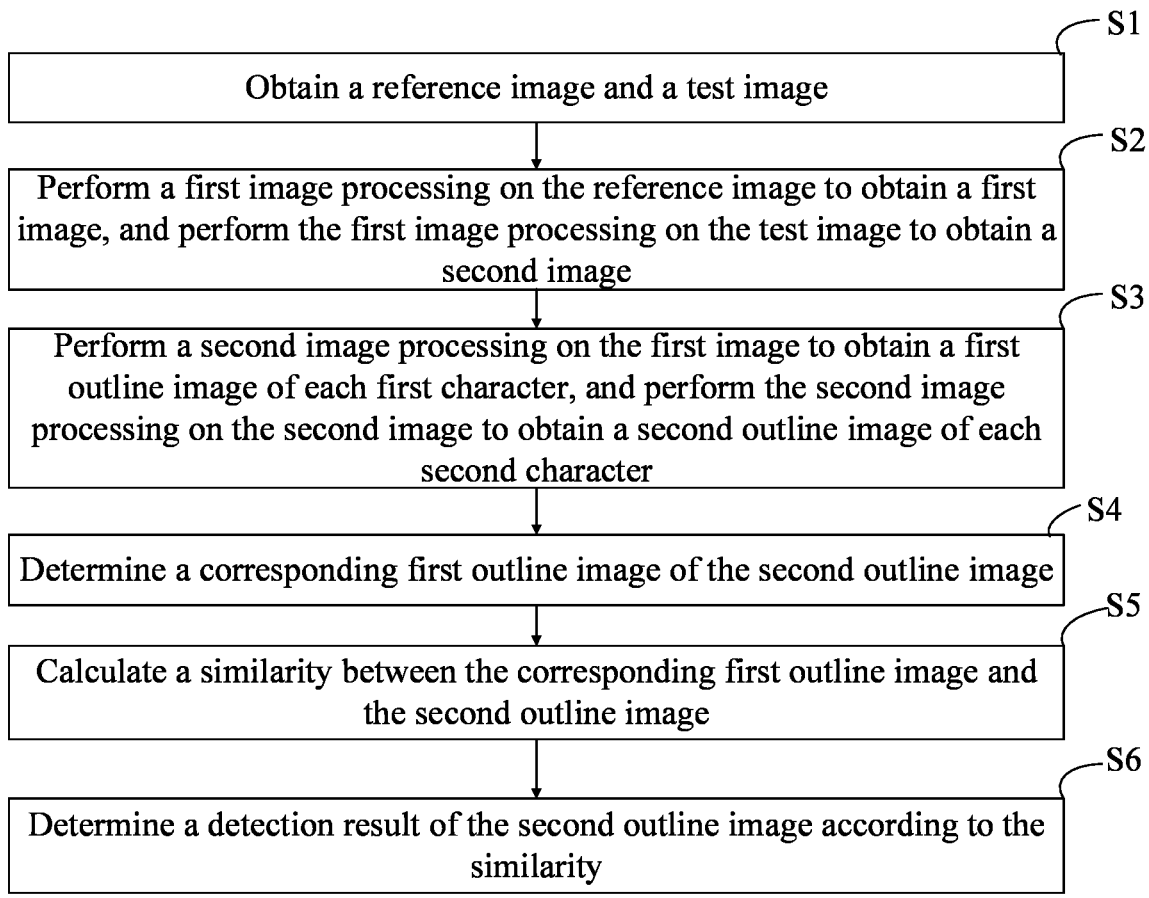
FIG. 1 is a flowchart of a method of detecting misprints in one embodiment of the present disclosure.

FIG. 1 is a flowchart of a method of detecting misprints in one embodiment. According to different requirements, the order of the blocks in the flowchart may be changed, and some blocks may be omitted.

Figure 2:
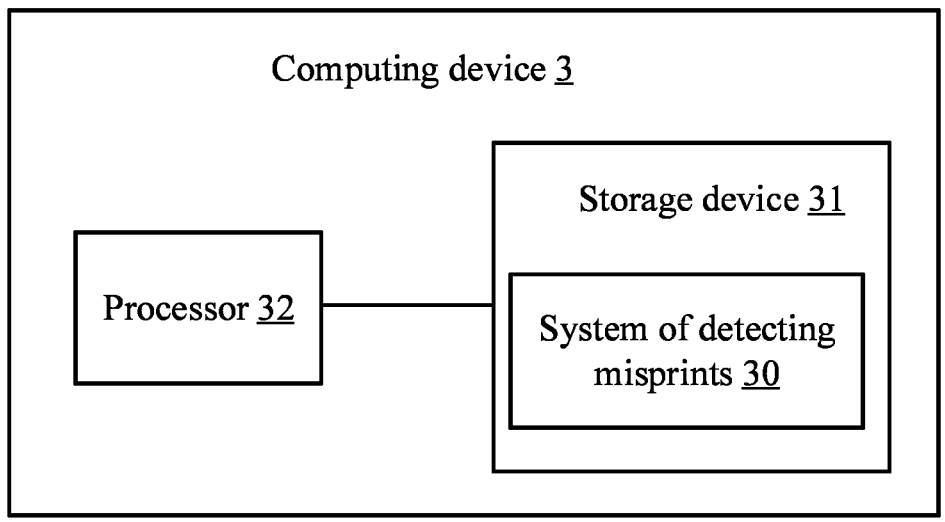
FIG. 2 is a block diagram of a computing device implementing the method in one embodiment of the present disclosure.

The method may be executed by a computing device (e.g., computing device 3 in FIG. 2). The method can be integrated in the computing device 3, or in a software development kit (SDK) run in the computing device 3.

In block S1, the computing device obtains an image of alphanumerics and/or symbols ("characters") which are perfectly formed as a reference image and also obtains a test image for analysis ("test image").

The characters in the reference image are first characters. The characters in the test image are second characters. The first characters in the reference image are perfectly formed (flawless).

The computing device may receive the reference image and the test image input by a user. The reference image and the test image may be pre-stored in a storage device of the computing device, or pre-stored in other devices connected to the computing device.

In one embodiment, the reference image may be an image of a sample product and/or its packaging with perfectly-formed printed characters (Golden Sample). The test image may be an image of a product to be detected ("test product"). The reference image and the test image can be compared to determine whether characters on the test product are not perfectly formed (defective) in comparison. In the embodiment, the first characters and the second characters may be Chinese characters, numbers, English letters, and the like.

In one embodiment, a size of the test image and the reference image are the same.

Figure 3:
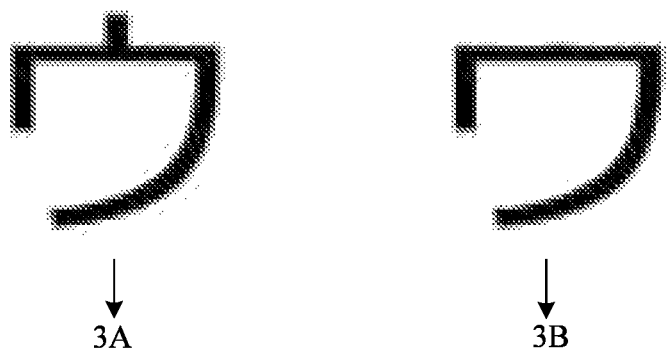
FIG. 3 shows a flawless reference image and a test image.

FIG. 3 shows a reference image and a test image provided. 3A represents a reference image including one character, and 3B represents a test image.

In block S2, the computing device performs a first image processing on the reference image to obtain a first image, and performs the first image processing on the test image to obtain a second image.

In one embodiment, performing a first image processing on the reference image may include: binarizing the reference image according to a first threshold. For example, when a pixel value at a first position in the reference image is greater than or equal to the first threshold (for example, the first threshold may be 30), a pixel at the first position is binarized to 255. When the pixel value at the first position is smaller than the first threshold, the pixel at the first position is binarized to 0. Therefore, the first image is obtained. Similarly, performing the first image processing on the test image may include binarizing the test image according to the first threshold. For example, when a pixel value at a second position in the test image is greater than or equal to the first threshold of 30, a pixel at the second position is binarized to be 255. When the pixel value at the second position is smaller than the first threshold, the pixel at the second position is binarized to be 0. Therefore, the second image is obtained.

Figure 4:
FIG. 4 show a first image obtained based on the reference image and a second image obtained based on the test image.

FIG. 4 show a first image obtained based on the reference image and a second image obtained based on the test image. 4A is a first image obtained based on the reference image 3A in FIG. 3. 4B is a second image obtained based on test image 3B in FIG. 3.

The computing device may determine the first threshold using an Otsu thresholding method. It should be noted that image binarization does not change size of an image. The size of the first image and the second image can be the same.

In block S3, the computing device performs a second image processing on the first image to obtain a first outline image of each of the first characters. The second image processing is performed on the second image to obtain a second outline image of each of the second characters.

In one embodiment, the computing device determines a first position of each of the first characters in the first image, and segments the first outline image from the first image according to the first position. Similarly, the computing device determines a second position of each of the second characters in the second image, and segments the second outline image from the second image according to the second position.

In one embodiment, the computing device may use optical character recognition (OCR) technology to recognize the first characters in the first image and the second characters in the second image, and may determine the first position of each of the first characters in the first image and the second position of each of the second characters in the second image.

For example, the computing device may use a first rectangle to select a first character in the first image. Each first character corresponds to one first rectangle, and each first rectangle contains a complete image of one first character. In one embodiment, a first position of a first character refers to a position of a first rectangle corresponding to the first character in the first image. The computing device may establish a first rectangular coordinate system (denoted as "xoy") for the first image. A lower left corner of the first image may be selected as an origin of the first rectangular coordinate system ("first origin", denoted as "o"), and two adjacent sides of the first image that pass the first origin may be selected as axes of the first rectangular coordinate system. The first rectangle is determined within the first rectangular coordinate system. For example, coordinates of the lower left corner of the first rectangular are (x1, y1), and coordinates of an upper right corner of the first rectangular are (x2, y2). The first position is represented by the coordinates (x1, y1) and the coordinates (x2, y2).

Similarly, the computing device may use a second rectangle to select a second character in the second image. Each second character corresponds to one second rectangle, and each second rectangle contains a complete image of one second character. In one embodiment, a second position of a second character refers to a position of a second rectangle corresponding to the second character in the second image. The computing device may establish a second rectangular coordinate system (denoted as "XOY") for the second image. A lower left corner of the second image may be selected as an origin of the second rectangular coordinate system ("second origin", denoted as "O"), and two adjacent sides of the second image that pass the second origin may be selected as axes of the second rectangular coordinate system. The second rectangle is determined within the second rectangular coordinate system. For example, coordinates of the lower left corner of the second rectangular are (X1, Y1), and coordinates of an upper right corner of the second rectangular are (X2, Y2). The second position is represented by coordinates (X1, Y1) and coordinates (X2, Y2).

If the sizes of the first image and the second image are the same, then when the coordinates of the first position and the second position are the same, the first character at the first position and the second character at the second position are the same character and correspond to the same position. In size, the first rectangle and the second rectangle are the same.

In one embodiment, the computing device may use a character-cutting function of OCR software to segment the first outline image according to the first position. The character-cutting function of the OCR software can segment the second outline image according to the second position.

For example, the computing device cuts the first character in the first image along edges of the first rectangle to obtain the first outline image of the first character. Similarly, the computing device cuts the second character in the second image along edges of the second rectangle to obtain the second outline image of the second character. Respective sizes of the first outline image and the second outline image of the same character in the same position will be the same.

In block S4, the computing device determines a corresponding first outline image of the second outline image. The corresponding first outline image and the second outline image include a same character.

In one embodiment, determining a corresponding first outline image of the second outline image includes: obtaining a first center point of the first outline image, and obtaining a second center point of the second outline image; and determining the corresponding first outline image of the second outline image according to the first center point and the second center point.

For example, the computing device may use an OpenCV algorithm to calculate the first center point of the first outline image and the second center point of the second outline image, and obtain coordinates x3 and y3 of the first center point in the first rectangular coordinate system and coordinates X3 and Y3 of the second center point in the second rectangular coordinate system. If the coordinates of the first center point and the second center point are the same, the computing device determines that the first outline image corresponds to the second outline image.

In block S5, the computing device calculates a similarity between the corresponding first outline image and the second outline image.

In one embodiment, the computing device calculates a first Fourier descriptor of the corresponding first outline image and a second Fourier descriptor of the second outline image, and calculates the similarity between the corresponding first outline image and the second outline image according to the first Fourier descriptor and the second Fourier descriptor.

In one embodiment, the similarity can be a cosine distance between the first Fourier descriptor and the second Fourier descriptor. For example, the first Fourier descriptor is a multi-dimensional vector denoted as M, the second Fourier descriptor is a multi-dimensional vector denoted as N. The similarity is a cosine distance denoted as dist(M, N), where dist(M,N)=1−cos(M,N). In one embodiment, a range of values of the similarity is [0, 2].

The first Fourier descriptor and the second Fourier descriptor have the characteristics of translation invariance, rotation invariance, and scale invariance, not being affected by positions, angles, or outline scaling etc. For example, referring to FIG. 4, the similarity between the character outline image in the image 4A and the character outline image in the image 4B is 0.06.

In block S6, the computing device determines a detection result of the second outline image according to the similarity.

Figure 5:
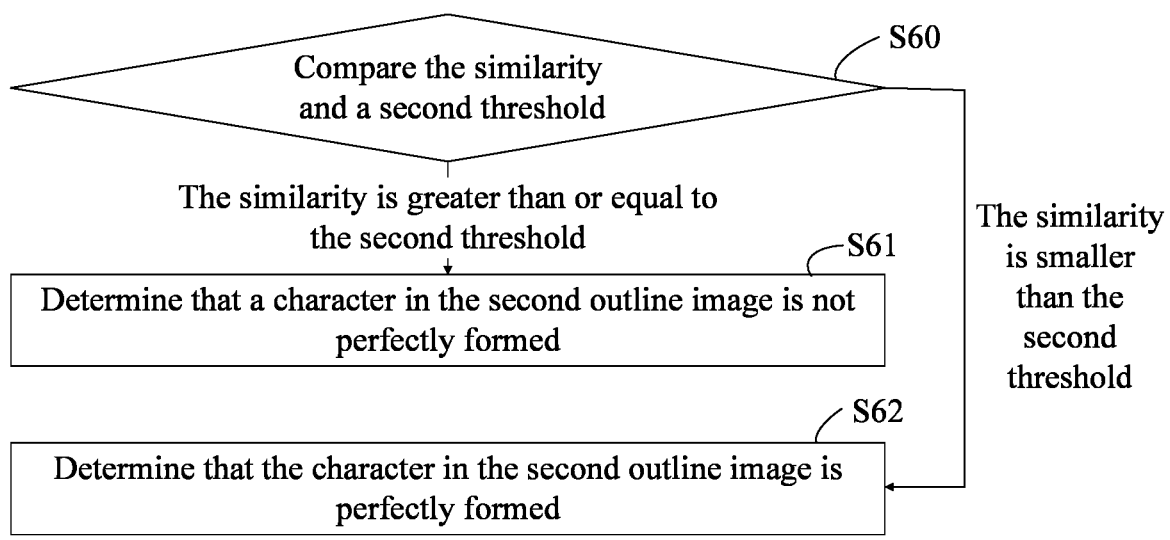
FIG. 5 is a sub-flowchart of block S6 in FIG. 1.

FIG. 5 is a sub-flowchart of block S6.

In block S60, the computing device compares the similarity and a second threshold. If the similarity is greater than or equal to the second threshold, the process goes to block S61. If the similarity is smaller than the second threshold, the process goes to block S62.

In one embodiment, the second threshold can be 0.05.

In block S61, the computing device determines that a character in the second outline image is not perfectly formed.

In one embodiment, when the character in the second outline image is found not perfectly formed (defective), the character in the test image is also not perfectly formed. For example, the similarity between the image 4A and the image 4B is 0.06, which is greater than the second threshold of 0.05. Therefore, the character in the image 4B is deemed defective, that is, the character in the image 3B is found to be defective.

In block S62, the computing device determines that the character in the second outline image is perfectly formed.

In one embodiment, when the character in the second outline image corresponding to the similarity is found perfectly formed (flawless), the character in the test image corresponding to the character in the second outline image is perfectly formed.

FIG. 1 describes in detail the method of the present disclosure. Hardware architecture that implements the method is described in conjunction with FIG. 2.

It should be understood that the described embodiments are for illustrative purposes only, and are not limited by this structure in the scope of the claims.

FIG. 2 is a block diagram of a computing device implementing the method in one embodiment of the present disclosure. The computing device 3 may include a storage device 31 and at least one processor 32. A computer program (such as a system of detecting misprints 30) may be stored in the storage device 31 and executable by the processor 32. The processor 32 may execute the computer program to implement the blocks in the method described above, such as blocks S1 to S6 in FIG. 1.

The computing device 3 may be a desktop computer, a notebook, a palmtop computer, or a cloud server. Hardware of the computing device may include, but is not limited to, a microprocessor, an application-specific integrated circuit (ASIC), a field-programmable gate array (FPGA), a digital signal processor (DSP), an embedded device, etc.

Those skilled in the art will understand that computing device 3 is only an example, and does not constitute a limitation. Other examples of computing device 3 may include more or fewer components than as shown in FIG. 2, or combine some components, or have different components.

The storage device 31 may be used to store the computer program, and the processor 32 implements the computing device by running or executing the computer program or module stored in the storage device 31 and calling up data stored in the storage device 31. The storage device 31 may include a storage program area and a storage data area. The storage program area may store an operating system, and programs required by at least one function, etc. The storage data area may store data and the like created in the use of the computing device 3. In addition, the storage device 31 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 32 may be a central processing unit (CPU) or other general-purpose processor, a digital signal processor (DSP), an application—specific integrated circuit (ASIC), a field-programmable gate array (FPGA) or other programmable logic device, a discrete gate, or a transistor logic device, or a discrete hardware component, etc. The processor 32 may be a microprocessor or any conventional processor. The processor 32 may be a control center of the computing device 3, and connect various parts of the entire computing device 3 by using various interfaces and lines.

In an exemplary embodiment, the computer program may be divided into one or more modules, and the one or more modules are stored in the storage device 31 and executed by the processor 32 to run the method of the present disclosure. The one or more modules can be a series of computer-readable instruction segments capable of performing specific functions, and the instruction segments are used to describe execution processes of the computer program in the computing device 3.

When the modules integrated in the computing device 3 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing embodiments of method. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the computing device 3 may also include a power source (such as a battery) for supplying power to various components. The power source may be logically connected to the at least one processor 32 through a power management device, so as to realize functions such as charging, discharging, and power consumption management. The power supply may also include any components such as one or more direct current or alternating current power supplies, recharging devices, power failure detection circuits, power converters or inverters, and power status indicators. The computing device 3 may also include various sensors, BLUETOOTH modules, WI-FI modules, etc.

In several embodiments provided in the preset disclosure, it should be understood that the disclosed computing device and method may be implemented in other ways. For example, the embodiments of the computing device described above are merely illustrative. For example, the units are only divided and designated according to logical function, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method of detecting misprints, comprising:
   obtaining a reference image and a test image, the reference image comprising first characters, the test image comprising second characters, and the first characters being perfectly formed;
   performing a first image processing on the reference image to obtain a first image, and performing the first image processing on the test image to obtain a second image;
   performing a second image processing on the first image to obtain a first outline image of each of the first characters, comprising: determining a first position of each of the first characters in the first image; and segmenting the first outline image from the first image according to the first position; and performing the second image processing on the second image to obtain a second outline image of each of the second characters, comprising: determining a second position of each of the second characters in the second image; and segmenting the second outline image from the second image according to the second position;
   determining a corresponding first outline image of the second outline image;
   calculating a similarity between the corresponding first outline image and the second outline image; and
   determining a detection result of the second outline image according to the similarity, comprising: comparing the similarity and a second threshold; determining that a character in the second outline image is not perfectly formed when the similarity is greater than or equal to the second threshold; and determining that the character in the second outline image is perfectly formed when the similarity is less than the second threshold;
   wherein determining the first position of each of the first characters in the first image comprises:
   recognizing the first characters in the first image by using an optical character recognition technology;
   selecting each of the first characters in the first image using a first rectangle, each of the first characters corresponding to one first rectangle;
   determining coordinates of a lower left corner and coordinates of an upper right corner of each first rectangle in a first rectangular coordinate system; and
   determining the first position of each of the first characters in the first image using the coordinates of the lower left corner and coordinates of the upper right corner of the corresponding first rectangle in the first rectangular coordinate system;
   wherein determining the second position of each of the second characters in the second image comprises:
   recognizing the second characters in the second image by using the optical character recognition technology;
   selecting each of the second characters in the second image using a second rectangle, each of the second characters corresponding to one second rectangle;
   determining coordinates of a lower left corner and coordinates of an upper right corner of each second rectangle in a second rectangular coordinate system; and
   determining the second position of each of the second characters in the second image using the coordinates of the lower left corner and coordinates of the upper right corner of the corresponding second rectangle in the second rectangular coordinate system.

2. The method of claim 1, wherein performing the first image processing on the reference image comprises:
   binarizing the reference image according to a first threshold; and
   performing the first image processing on the test image comprises:
   binarizing the test image according to the first threshold.

3. The method of claim 1, wherein determining the corresponding first outline image of the second outline image comprises:
   obtaining a first center point of the first outline image, and obtaining a second center point of the second outline image; and
   determining the corresponding first outline image of the second outline image according to the first center point and the second center point.

4. The method of claim 1, wherein calculating the similarity between the corresponding first outline image and the second outline image comprises:
   calculating a first Fourier descriptor of the corresponding first outline image and a second Fourier descriptor of the second outline image; and
   determining the similarity between the corresponding first outline image and the second outline image according to the first Fourier descriptor and the second Fourier descriptor.

5. The method of claim 4, wherein the similarity comprises a cosine distance between the first Fourier descriptor and the second Fourier descriptor.

6. The method of claim 1, wherein a range of values of the similarity is [0, 2].

7. The method of claim 1, wherein a size of the test image and a size of the reference image are the same.

8. A computing device comprising:
   at least one processor; and
   a storage device storing computer-readable instructions, which when executed by the at least one processor, cause the at least one processor to:

obtain a reference image and a test image, the reference image comprising first characters, the test image comprising second characters, and the first characters being perfectly formed;

perform a first image processing on the reference image to obtain a first image, and perform the first image processing on the test image to obtain a second image;

perform a second image processing on the first image to obtain a first outline image of each of the first characters, comprising: determining a first position of each of the first characters in the first image; and segmenting the first outline image from the first image according to the first position; and perform the second image processing on the second image to obtain a second outline image of each of the second characters, comprising: determining a second position of each of the second characters in the second image; and segmenting the second outline image from the second image according to the second position;

determine a corresponding first outline image of the second outline image;

calculate a similarity between the corresponding first outline image and the second outline image; and determine a detection result of the second outline image according to the similarity, comprising: comparing the similarity and a second threshold; determining that a character in the second outline image is not perfectly formed when the similarity is greater than or equal to the second threshold; and determining that the character in the second outline image is perfectly formed when the similarity is less than the second threshold;

wherein the at least one processor determines the first position of each of the first characters in the first image by:

recognizing the first characters in the first image by using an optical character recognition technology;

selecting each of the first characters in the first image using a first rectangle, each of the first characters corresponding to one first rectangle;

determining coordinates of a lower left corner and coordinates of an upper right corner of each first rectangle in a first rectangular coordinate system; and determining the first position of each of the first characters in the first image using the coordinates of the lower left corner and coordinates of the upper right corner of the corresponding first rectangle in the first rectangular coordinate system;

wherein the at least one processor determines the second position of each of the second characters in the second image by:

recognizing the second characters in the second image by using the optical character recognition technology;

selecting each of the second characters in the second image using a second rectangle, each of the second characters corresponding to one second rectangle;

determining coordinates of a lower left corner and coordinates of an upper right corner of each second rectangle in a second rectangular coordinate system; and determining the second position of each of the second characters in the second image using the coordinates of the lower left corner and coordinates of the upper right corner of the corresponding second rectangle in the second rectangular coordinate system.

9. The computing device of claim 8, wherein the at least one processor is further caused to:
binarize the reference image according to a first threshold; and
binarize the test image according to the first threshold.

10. The computing device of claim 8, wherein the at least one processor is further caused to:
obtain a first center point of the first outline image, and obtain a second center point of the second outline image; and
determine the corresponding first outline image of the second outline image according to the first center point and the second center point.

11. The computing device of claim 8, wherein the at least one processor is further caused to:
calculate a first Fourier descriptor of the corresponding first outline image and a second Fourier descriptor of the second outline image; and
determine the similarity between the corresponding first outline image and the second outline image according to the first Fourier descriptor and the second Fourier descriptor.

12. The computing device of claim 8, wherein a size of the test image and a size of the reference image are the same.

13. A non-transitory storage medium having stored thereon computer-readable instructions that, when the computer-readable instructions are executed by a processor to implement the following method:
obtaining a reference image and a test image, the reference image comprising first characters, the test image comprising second characters, and the first characters being perfectly formed;
performing a first image processing on the reference image to obtain a first image, and performing the first image processing on the test image to obtain a second image;
performing a second image processing on the first image to obtain a first outline image of each of the first characters, comprising: determining a first position of each of the first characters in the first image; and segmenting the first outline image from the first image according to the first position; and performing the second image processing on the second image to obtain a second outline image of each of the second characters, comprising: determining a second position of each of the second characters in the second image; and segmenting the second outline image from the second image according to the second position;
determining a corresponding first outline image of the second outline image;
calculating a similarity between the corresponding first outline image and the second outline image; and
determining a detection result of the second outline image according to the similarity, comprising: comparing the similarity and a second threshold; determining that a character in the second outline image is not perfectly formed when the similarity is greater than or equal to the second threshold; and determining that the character in the second outline image is perfectly formed when the similarity is less than the second threshold;
wherein determining the first position of each of the first characters in the first image comprises:
recognizing the first characters in the first image by using an optical character recognition technology;
selecting each of the first characters in the first image using a first rectangle, each of the first characters corresponding to one first rectangle;
determining coordinates of a lower left corner and coordinates of an upper right corner of each first rectangle in a first rectangular coordinate system; and determining the first position of each of the first characters in the first image using the coordinates of the lower left corner and coordinates of the upper right corner of the corresponding first rectangle in the first rectangular coordinate system;

wherein determining the second position of each of the second characters in the second image comprises:

recognizing the second characters in the second image by using the optical character recognition technology;

selecting each of the second characters in the second image using a second rectangle, each of the second characters corresponding to one second rectangle;

determining coordinates of a lower left corner and coordinates of an upper right corner of each second rectangle in a second rectangular coordinate system; and determining the second position of each of the second characters in the second image using the coordinates of the lower left corner and coordinates of the upper right corner of the corresponding second rectangle in the second rectangular coordinate system.

14. The non-transitory storage medium of claim 13, wherein calculating the similarity between the corresponding first outline image and the second outline image comprises:

calculating a first Fourier descriptor of the corresponding first outline image and a second Fourier descriptor of the second outline image; and determining the similarity between the corresponding first outline image and the second outline image according to the first Fourier descriptor and the second Fourier descriptor.

15. The non-transitory storage medium of claim 13, wherein performing a first image processing on the reference image comprises:

binarizing the reference image according to a first threshold; and performing the first image processing on the test image comprises:

binarizing the test image according to the first threshold.

16. The non-transitory storage medium of claim 13, wherein determining the corresponding first outline image of the second outline image comprises:

obtaining a first center point of the first outline image, and obtaining a second center point of the second outline image; and determining the corresponding first outline image of the second outline image according to the first center point and the second center point.

17. The non-transitory storage medium of claim 13, wherein a size of the test image and a size of the reference image are the same.

* * * * *